(12) United States Patent
Hayhow (10) Patent No.: US 9,165,298 B2
(45) Date of Patent: Oct. 20, 2015

(54) REMOTE SYNCHRONIZATION OF PIN-PAD RECORDS WITH A CENTRAL TRANSACTIONS DATABASE

(71) Applicant: THE TORONTO-DOMINION BANK, Mississauga (CA)

(72) Inventor: Robert Hayhow, Burlington, CA (US)

(73) Assignee: THE TORONTO-DOMINION BANK, Mississauga (CA)

( * ) Notice: Subject to any disclaimer, the term of this patent is extended or adjusted under 35 U.S.C. 154(b) by 0 days.

(21) Appl. No.: 14/631,607

(22) Filed: Feb. 25, 2015

(65) Prior Publication Data

US 2015/0242854 A1    Aug. 27, 2015

Related U.S. Application Data

(60) Provisional application No. 61/944,562, filed on Feb. 25, 2014.

(51) Int. Cl.
*G06K 5/00* (2006.01)
*G06Q 20/00* (2012.01)
*G06Q 20/40* (2012.01)
*G06Q 20/02* (2012.01)

(52) U.S. Cl.
CPC .............. *G06Q 20/40* (2013.01); *G06Q 20/027* (2013.01)

(58) Field of Classification Search
CPC ........ G06Q 20/00; G06Q 20/01; G06Q 20/02
USPC ........................................................ 235/380
See application file for complete search history.

(56) References Cited

U.S. PATENT DOCUMENTS

| | | | | |
|---|---|---|---|---|
| 5,285,382 | A * | 2/1994 | Muehlberger et al. | 705/17 |
| 8,615,445 | B2 * | 12/2013 | Dorsey et al. | 705/26.1 |
| 8,756,156 | B1 * | 6/2014 | Campi et al. | 705/40 |
| 2003/0222138 | A1 * | 12/2003 | Oppenlander et al. | 235/380 |
| 2005/0038738 | A1 * | 2/2005 | Peck et al. | 705/40 |
| 2008/0103968 | A1 * | 5/2008 | Bies et al. | 705/39 |
| 2011/0137802 | A1 * | 6/2011 | Spies et al. | 705/65 |
| 2011/0244799 | A1 * | 10/2011 | Roberts et al. | 455/41.2 |
| 2013/0031003 | A1 * | 1/2013 | Dorsey et al. | 705/44 |
| 2013/0297485 | A1 * | 11/2013 | Whitney | 705/38 |
| 2014/0279117 | A1 * | 9/2014 | Choi et al. | 705/21 |
| 2014/0351130 | A1 * | 11/2014 | Cheek et al. | 705/44 |

* cited by examiner

*Primary Examiner* — Daniel Hess
(74) *Attorney, Agent, or Firm* — Knobbe Martens Olson & Bear LLP (57) ABSTRACT

A method of remotely synchronizing pin-pad terminals involves a gateway receiving from an acquirer server an authorization code for a transaction authorized using one of a plurality of pin-pad terminals, and saving in a database particulars of the authorized transaction. Each terminal has a memory storing particulars of at least one authorized transaction authorized using the terminal, and a running total value of all transactions authorized using the pin-pad terminal. The gateway receives a request to close out all the saved transactions and receives from one of the terminals an authorization request message requesting authorization for an additional transaction. In response, the gateway closes in the database all the saved transactions authorized using the one terminal, and responds to the authorization request message by providing the one terminal with a remote synchronization command commanding the one terminal to clear the running total from the memory.

11 Claims, 7 Drawing Sheets

REMOTE SYNCHRONIZATION OF PIN-PAD RECORDS WITH A CENTRAL TRANSACTIONS DATABASE

CROSS-REFERENCE TO RELATED APPLICATION

This application claims the benefit of priority under 35 U.S.C. §119(e) of U.S. Provisional Application No. 61/944,562, filed Feb. 25, 2014, the disclosure of which is hereby incorporated by reference herein in its entirety.

FIELD OF THE INVENTION

This patent application relates to a system and method for synchronizing pin-pad terminals.

BACKGROUND

In the conventional method of effecting in-store electronic payments, the merchant's customer interfaces a payment card with the merchant's pin-pad terminal, and the pin-pad terminal sends the merchant's acquirer an authorization request message requesting authorization for the electronic payment. The authorization request message is directed to the issuer of the payment card, which authorizes or declines the electronic payment after considering several factors, including whether the account associated with the payment card has sufficient credit/funds to effect the payment.

SUMMARY

This patent application discloses a network gateway and associated method that remotely synchronizes pin-pad terminals with a centralized database of transactions.

In accordance with a first aspect of the disclosure, there is provided a method of remotely synchronizing pin-pad records with a central transactions database. Each pin-pad terminal is configured to communicate with a network gateway and has a memory storing particulars of at least one authorized transaction authorized using the pin-pad terminal and a running total value of all transactions authorized using the pin-pad terminal.

The network gateway is in communication with at least one of the pin-pad terminals and a merchant acquirer server. The network gateway receives from the merchant acquirer server an authorization code for one of the authorized transactions, and saves in a central transactions database the particulars of the one authorized transaction. The network gateway also receives a request to close out all the saved transactions, and receives from one of the pin-pad terminals an authorization request message requesting authorization for an additional transaction. In response, the network gateway closes, in the central transactions database, all the saved transactions authorized using the one pin-pad terminal, and responds to the authorization request message by providing the one pin-pad terminal with a remote synchronization command commanding the one pin-pad terminal to clear the running total from the memory.

In accordance with the first aspect of the disclosure, there is also provided a network gateway that includes a network interface, a transactions database, and a processor. The network interface is configured for communication with at least one pin-pad terminal and a merchant acquirer server. Each pin-pad terminal has a memory storing particulars of at least one authorized transaction authorized using said pin-pad terminal.

The processor is coupled to the network interface and the transactions database and is configured to receive from the merchant acquirer server an authorization code for one of the authorized transactions, and to save in the database the particulars of the one authorized transaction. The processor is also configured to receive a request to close out all the saved transactions, and to receive from one of the pin-pad terminals an authorization request message requesting authorization for an additional transaction.

In response, the processor is configured to close, in the transactions database, all the saved transactions authorized using the one pin-pad terminal, and to respond to the authorization request message by providing the one pin-pad terminal with a remote synchronization command commanding the one pin-pad terminal to clear the running total from the memory.

In a preferred implementation, the processor is configured to close all the saved transactions by associating with a closed status identifier all the saved transactions authorized using the one pin-pad terminal. The authorization request may include a terminal credential uniquely associated with the one pin-pad terminal, and the processor may be configured to respond with a remote synchronization command by querying the transactions database with the terminal credential to locate the saved transactions associated with the one pin-pad terminal and the closed status identifier.

The remote synchronization command may further command the one pin-pad terminal to close the at least one authorized transaction in the memory thereof.

In accordance with a second aspect of the disclosure, there is provided a method of controlling access to pending transactions maintained in a pending transaction database. The method involves an electronic cash register receiving from one of a plurality of pin-pad terminals a transaction record request requesting particulars of one of the pending transactions maintained in the pending transaction database.

The electronic cash register determines a status of the one pending transaction. Upon the status indicating the one pending transaction is locked, the electronic cash register notifies the one pin-pad terminal of an unavailability of the one pending transaction. Upon the status indicating the one pending transaction is unlocked, the electronic cash register provides the pending transaction database with the transaction record request.

In accordance with the second aspect of the disclosure, there is also provided an electronic cash register that includes a network interface and a transaction record processor coupled to the network interface. The network interface is configured for communication with a plurality of pin-pad terminals. The transaction record processor is configured to receive from one of the pin-pad terminals a transaction record request requesting particulars of one of a plurality of pending transactions maintained in a pending transaction database, and to determine a status of the one pending transaction. The transaction record processor is also configured to notify the one pin-pad terminal of an unavailability of the one pending transaction upon the status indicating the one pending transaction is locked, and to provide the pending transaction database with the transaction record request upon the status indicating the one pending transaction is unlocked.

BRIEF DESCRIPTION OF THE DRAWINGS

A network gateway, and method of remotely synchronizing pin-pad records will now be described, with reference to the accompanying drawings, in which.

DETAILED DESCRIPTION

Electronic Payment Processing Network—Overview

Figure 1:
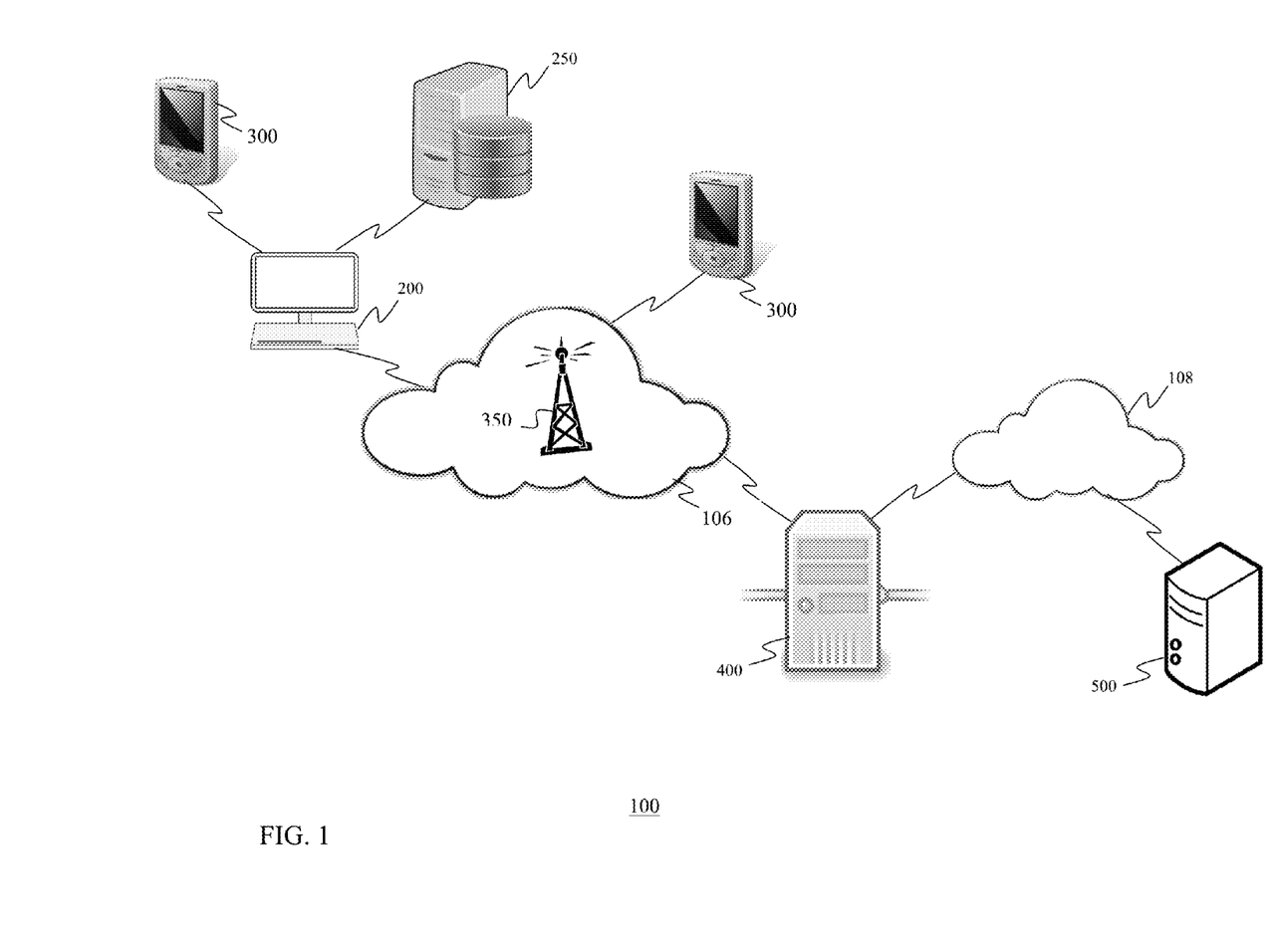
FIG. 1 is a schematic view of an exemplary electronic payment processing network, depicting an electronic cash register, a pin-pad terminal and an exemplary network gateway.

FIG. 1 is a schematic view of an electronic payment processing network, denoted generally as 100. As shown, the electronic payment processing network 100 comprises an electronic cash register 200, a pending transaction database 250, a plurality of pin-pad terminals 300, a network gateway 400, and a payment card issuer server 500. The electronic payment processing network 100 may also include one or more wireless access points 350. The electronic payment processing network 100 is configured to open/close transactions for services provided to customers, and to process electronic payments for those services.

Although the electronic payment processing network 100 is shown comprising only a single electronic cash register 200, a single network gateway 400, and a single payment card issuer server 500, the electronic payment processing network 100 typically comprises a plurality of the electronic cash registers 200, a plurality of the network gateways 400, and/or a plurality of the payment card issuer servers 500.

The electronic cash register(s) 200 is/are deployed at the merchant's business premises and is/are configured to communicate with the pending transaction database 250, and to communicate with the network gateway 400 via the merchant's secure acquirer network 106. Although the pending transaction database 250 is shown in FIG. 1 as being a distinct entity from the electronic cash register 200, the functionality of the pending transaction database 250 may be integrated with the electronic cash register 200.

Each pin-pad terminal 300 is configured to interface with a payment card (e.g. credit card, debit card, gift card). One or more of the pin-pad terminals 300 may be deployed at the merchant's business premises and configured to communicate with a respective electronic cash register 200 via a wired link. One or more of the pin-pad terminals 300 that are deployed at the merchant's business premises may also be WiFi-enabled (IEEE 802.11 compliant) and configured to communicate with one of the electronic cash registers 200 via one of the wireless access points 350. One or more of the pin-pad terminals 300 may be deployed remotely from the merchant's business premises and may be cellular-enabled (e.g. HSPA (High Speed Packet Access) compliant) and configured to communicate with one of the electronic cash registers 200 via one of the wireless access points 350.

Together, the electronic cash register(s) 200 and the pin-pad terminals 300 co-operate to process electronic payments initiated by payment cardholders at the pin-pad terminals 300. The electronic payments typically comprise payments for services for which the merchant requests clearance and settlement well after the service is performed (or the wares are provided) and the payment is authorized, such as the end of the business day.

The access points 350 are each interfaced with the merchant's secure acquirer network 106. One or more of the access points 350 may comprise a WiFi access point (and associated router) that is configured to communicate with WiFi-enabled pin-pad terminals 300. One or more of the access points 350 may comprise a cellular (e.g. HSPA) access point that is configured to communicate with cellular-enabled pin-pad terminals 300.

Each network gateway 400 is associated with the financial institution used by the respective merchant, and is configured to communicate with the merchant's pin-pad terminals 300 via the merchant's secure acquirer network 106. The financial institution maintains an acquirer server (not shown), and an associated secure accounts database that includes a plurality of clusters each associated with a respective financial account. Each cluster is also uniquely associated with a respective merchant and typically identifies credit/deposit entries posted to the associated financial account.

The network gateways 400 are also configured to authenticate the pin-pad terminals 300, and to facilitate communication between the acquirer and the payment card issuer server(s) 500 via a secure payment network 108, such as VisaNet or the Mastercard Network.

Each issuer server 500 is associated with and administered by a respective financial institution. The financial institution associated with the issuer server 500 issues payment cards to cardholders (or authorizes a third party to issue the payment cards). Each issuer server 500 is configured to communicate with the network gateways 400 via the secure payment network 108, and maintains a secure accounts database that includes a plurality of clusters each associated with a respective financial account. Each cluster is uniquely associated with a respective payment card and typically identifies credit/deposit entries posted to the associated financial account, and an account number that is uniquely associated with the payment card.

Electronic Cash Register

Figure 2:
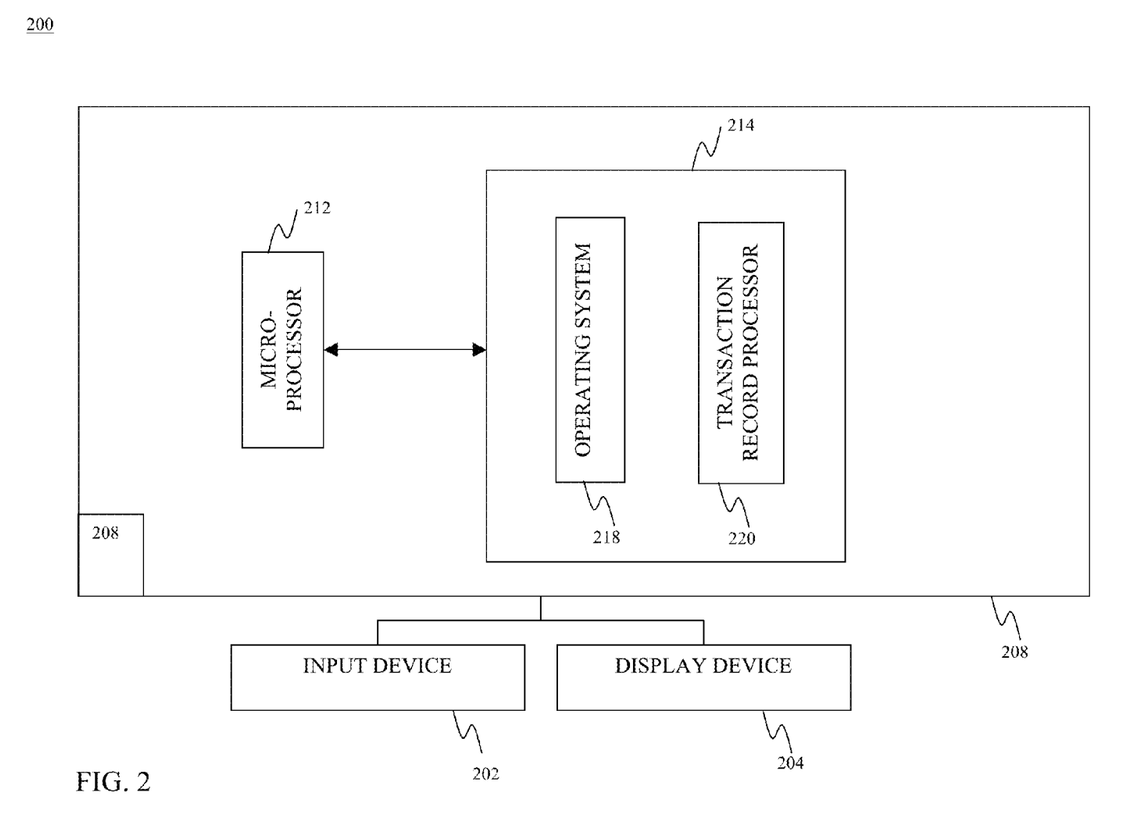
FIG. 2 is a schematic view of an exemplary electronic cash register.

As shown in FIG. 2, the electronic cash register 200 includes an input device 202, a display device 204, and a computer processing unit 206 that is coupled to the input device 202 and the display device 204. The electronic cash register 200 may also include a pin-pad interface 208 (e.g. serial data port, network interface) that is configured to interface one or more pin-pad terminals 300 with the electronic cash register 200 via a wired link.

The input device 202 may be implemented as a keyboard, touchpad, touchscreen or other input device suitable for allowing a user of the payment terminal 200 to input data and/or commands that may be required to complete the financial transaction. The display device 204 may be implemented as a liquid crystal display (LCD) panel, cathode ray tube (CRT) display, plasma display panel, or other display device suitable for displaying transaction information to the user.

The computer processing unit includes a microprocessor 212 and computer-readable medium 214. The computer-readable medium 214 may be provided as non-volatile electronic computer memory (e.g. FLASH memory) or optical or magnetic memory (e.g. compact disc, hard disk). The electronic cash register 200 may save transaction identifiers in the computer-readable medium (memory) 214, each together with a respective status identifier (e.g. "locked", "unlocked"). As will become apparent, the electronic cash register 200 uses the status identifiers to prevent multiple pin-pad terminals 200 from simultaneously accessing/updating the same pending transaction stored in the pending transaction database 250.

The memory 214 also includes non-transient computer processing instructions stored thereon which, when accessed from the memory 214 and executed by the microprocessor 212, implement an operating system 218, and a transaction record processor 220. The operating system 218 allows the electronic cash register 200 to accept user input from the input device 202 and to control the display device 204.

The operation of the transaction record processor 220 will be discussed in greater detail below. However, it is sufficient at this point to note that the transaction record processor 220 is configured to maintain in the pending transaction database 250 particulars of each of a plurality of transactions that are being provided to customers at the merchant's premises, and to close out transactions in the pending transaction database 250 as the transaction record processor 220 receives authorization from the network gateway 400 for the associated electronic payment.

The transaction record processor 220 is also configured to (i) receive from one of the pin-pad terminals 300 a transaction record request requesting particulars of one of the plurality of pending transactions maintained in the pending transaction database 250, (ii) determine the status of the one pending transaction, (ii) notify the one pin-pad terminal 300 of the unavailability of the one pending transaction upon the status indicating the one pending transaction is locked, and (iii) provide the pending transaction database 250 with the transaction record request upon the status indicating the one pending transaction is unlocked.

Although the transaction record processor 220 is typically implemented as computer processing instructions, all or a portion of the functionality of the transaction record processor 220 may be implemented instead in electronics hardware, such as a field programmable logic gate array (FPGA) or a complex programmable logic device (CPLD).

Pin-Pad Terminal

Although not shown in the drawings, each pin-pad terminal 300 includes an input device, a display device, a payment card interface, and a computer processing unit that is coupled to the input device, the display device and the payment card interface. The payment card interface is configured to communicate with a payment card.

The payment card may be implemented as a plastic card that has a contact form factor and/or a contactless (e.g. ISO 14443 based) form factor. If the payment card has a contact form factor, the pin-pad terminal 300 may comprise a physical port (e.g. smartcard reader, magnetic stripe reader) that allows the pin-pad terminal 300 to communicate with or receive information directly from the payment card. If the payment card has a contactless form factor, the payment card interface may comprise a wireless interface that allows the pin-pad terminal 300 to communicate with the payment card via a wireless protocol, such as ISO 14443. Alternately, the payment card may be implemented as software within a portable communications device, such as a smartphone, in which case the payment card interface may be configured to communicate with the payment card of the portable communications device using short-range communications protocols, such as Bluetooth and/or Near Field Communications (NFC) as examples.

The pin-pad terminal 300 may also include a cash register interface that allows the pin-pad terminal 300 to communicate with the electronic cash register 200 and the network gateway 400. The cash register interface may be configured as, for example, a serial port, that directly interfaces the pin-pad terminal 300 to one of the electronic cash registers 200 via a wired link. Alternately, the cash register interface may be configured as a wireless (e.g. WiFi, cellular) interface that indirectly interfaces the pin-pad terminal 300 to one of the electronic cash registers 200 (and the network gateway 400) via one of the wireless access points 350.

The computer processing unit of the pin-pad terminal 300 includes a microprocessor and computer-readable medium. The computer-readable medium may be provided as non-volatile electronic computer memory (e.g. FLASH memory) and stores particulars (e.g. payment amount, merchant authorization code) of transactions that were authorized using the pin-pad terminal 300, and a running monetary total amount of all transactions authorized using the pin-pad terminal 300 in the current business day. The memory may also store a digital certificate and a terminal credential (e.g. terminal ID) which allow the pin-pad terminal 300 to authenticate itself to the network gateway 400.

The memory also includes non-transient computer processing instructions stored thereon which, when accessed and executed by the microprocessor, implement an operating system, a transaction processor and a payment card processor. The operating system allows the pin-pad terminal 300 to accept user input from the input device and to control the display device and the payment card interface.

The operation of the transaction processor and the payment card processor will be discussed in greater detail below. However, it is sufficient at this point to note that the transaction processor is configured to open new transactions in the pending transaction database 250, modify pending transactions, obtain the outstanding monetary amount owing for pending transactions, close pending transactions in the pending transaction database 250, and respond to a remote synchronization command (received from the network gateway 400) by clearing the running total from the memory. The transaction processor may also close out authorized transactions in the memory.

The payment card processor is configured to effect electronic payment for a pending transaction by requesting from a payment card that is interfaced with the payment card interface, an account number that is uniquely associated with the payment card, and transmitting that account number to the network gateway 400. Depending upon the functionality implemented by the payment card, the payment card processor may also be configured to transmit to the payment card the outstanding monetary amount owed for the transaction, and to receive from the payment card a cryptogram generated by the payment card from the outstanding monetary amount and a cryptographic key that is uniquely associated with the payment card.

Although the transaction processor is typically implemented as computer processing instructions, all or a portion of the functionality of the transaction processor may be implemented instead in electronics hardware, such as a field programmable logic gate array (FPGA) or a complex programmable logic device (CPLD).

Network Gateway

Figure 3:
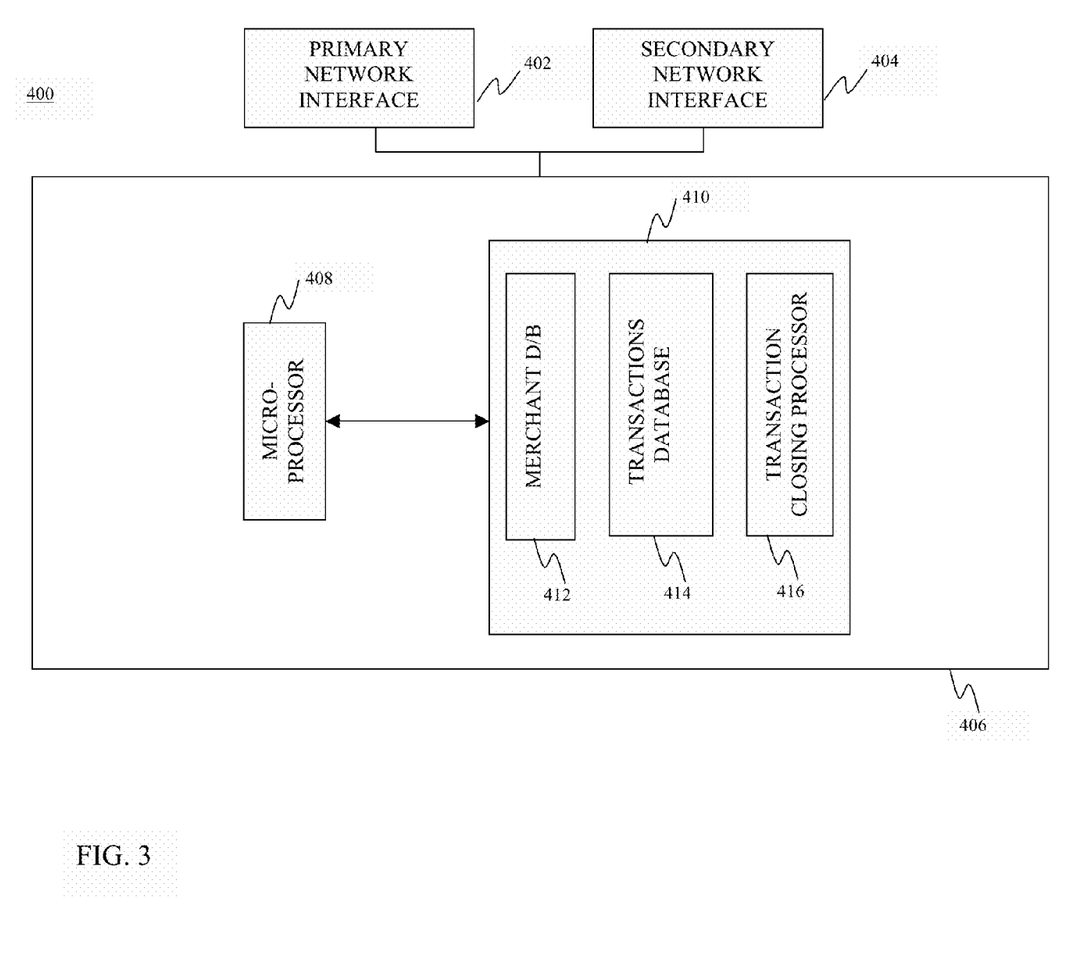
FIG. 3 is a schematic view of an exemplary network gateway.

As shown in FIG. 3, the network gateway 400 includes a primary network interface 402, a secondary network interface 404, and a computer processing unit 406 that is coupled to the primary network interface 402 and the secondary network interface 404. The primary network interface 402 interfaces the network gateway 400 with the acquirer network 106 and allows the network gateway 400 to communicate with the pin-pad terminals 300. The secondary network interface 404 interfaces the network gateway 400 with the payment network 108.

The computer processing unit 406 may include a microprocessor 408 and a computer-readable medium 410. The computer-readable medium 410 may be provided as electronic computer memory (e.g. flash memory) or optical or magnetic memory (e.g. compact disc, hard disk) and may implement a merchant database 412 and a central transactions database 414. The merchant database 412 includes a plurality of clusters each associated with a respective merchant. Each cluster identifies the terminal credentials of all the pin-pad terminals 300 used by the associated merchant. The central transactions database 414 stores particulars of all transactions that were authorized using the pin-pad terminals 300 but have not yet been cleared or settled.

The memory 410 may also include computer processing instructions stored thereon which, when executed by the microprocessor 408, define an operating system (not shown) that controls the overall operation of the network gateway 400.

The computer processing instructions may also implement a transaction tracking processor 416 that is configured to receive from the merchant acquirer server an authorization code for one of the authorized transactions, save in the transactions database 414 the particulars of the one authorized transaction, receive a request to close out all the saved transactions, and to receive from one of the pin-pad terminals 300 an authorization request message requesting authorization for an additional transaction. Preferably the computer processing instructions implement a secure web portal that allows merchants to issue to the transaction tracking processor 416 a single close command that requests the transaction tracking processor 416 close out all the saved authorized transactions that are associated with the merchant's pin-pad terminals 300 in the transactions database 414.

The transaction tracking processor 416 is also configured to, in response to the authorization request message, (i) in the transactions database 414 close all the saved transactions authorized using the one pin-pad terminal 300, and (ii) respond to the authorization request message by providing the one pin-pad terminal 300 with a remote synchronization command commanding the one pin-pad terminal to clear the running total from the memory.

Although the transaction tracking processor 416 is typically implemented as computer processing instructions, all or a portion of the functionality of the transaction tracking processor 416 may be implemented instead in electronics hardware, such as a field programmable logic gate array (FPGA) or a complex programmable logic device (CPLD).

Method of Updating Pending Transactions—Overview

Figure 7:
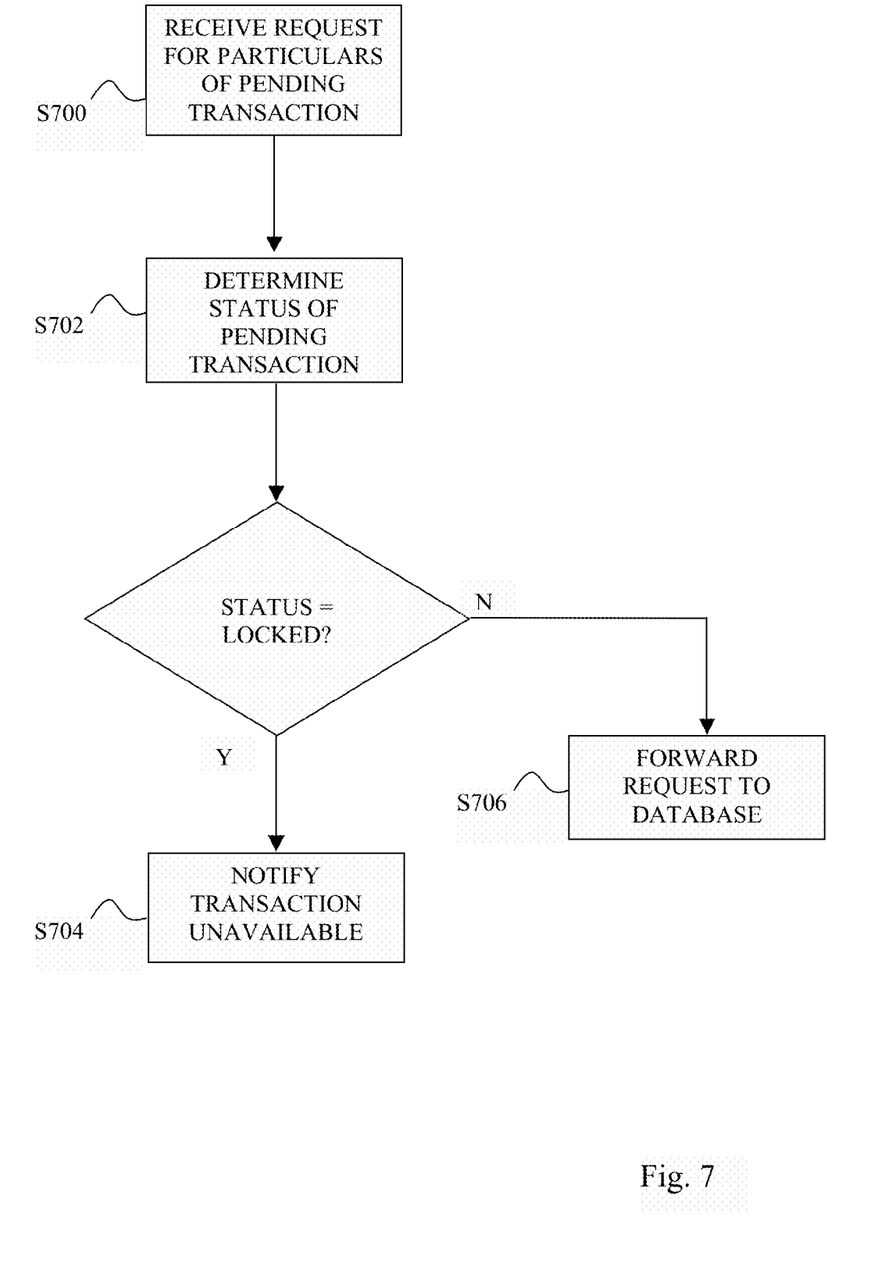
FIG. 7 is a flow chart depicting a method of updating transaction particulars in a pending transaction database.

As discussed, the electronic payment processing network 100 implements a method of updating pending transactions that are maintained in the pending transaction database 250. As shown in FIG. 7, this method begins, at step S700, with the electronic cash register 200 receiving from one of the pin-pad terminals 300 a transaction record request requesting particulars of one of the pending transactions. At step S702, the electronic cash register 200 determines the status of the one pending transaction. Upon the status indicating the one pending transaction is locked, the electronic cash register 200 notifies the one pin-pad terminal 200 of the unavailability of the one pending transaction, at step S704. Upon the status indicating the one pending transaction is unlocked, the electronic cash register 200 provides the pending transaction database 250 with the transaction record request, at step S706.

Method of Remotely Synchronizing Pin-Pad Records—Overview

The electronic payment processing network 100 also implements a method of remotely synchronizing records of pin-pad terminals 300 with the central transactions database 414. This latter method begins with the network gateway 400 receiving from the merchant acquirer server an authorization code for one of the authorized transactions authorized using one of the pin-pad terminals 300, and saving in the transactions database 414 the particulars of the one authorized transaction. As discussed above, each pin-pad terminal 300 stores in the memory thereof particulars of at least one authorized (but unsettled) transaction that was authorized using the pin-pad terminal 300, and a running total value of all transactions that were authorized using the pin-pad terminal 300. The central transactions database 414 saves the particulars of each authorized (but unsettled) transaction that has been authorized using one of the pin-pad terminals 300.

The network gateway then receives a request to close out all the saved transactions, and receives from one of the pin-pad terminals 300 an authorization request message requesting authorization for an additional transaction. In response, the network gateway (i) in the transactions database 414, closes all the saved transactions authorized using the one pin-pad terminal 300, an (ii) responds to the authorization request message by providing the one pin-pad terminal 300 with a remote synchronization command commanding the one pin-pad terminal 300 to clear the running total from the memory.

Updating Transactions and Remotely Synchronizing Pin-Pad Records—Detailed Discussion Updating Transaction Particulars The aforementioned methods will now be discussed in detail with reference to FIGS. 4 to 6. In the foregoing discussion, the merchant operates a food services business or restaurant that serves customers in the merchant's premises, and also serves customers remotely from the merchant's premises (e.g. home delivery). Within the merchant's premises, the merchant uses both pin-pad terminals 300 that are wired directly to the electronic cash register 200, and WiFi-enabled pin-pad terminals 300 that communicate with the electronic cash register 200 via local (on-premises) WiFi-enabled access points 350. Remotely from the merchant's premises, the merchant uses HSPA-enabled pin-pad terminals 300 that communicate with the electronic cash register 200 via remote HSPA-enabled access points 350.

Figure 4:
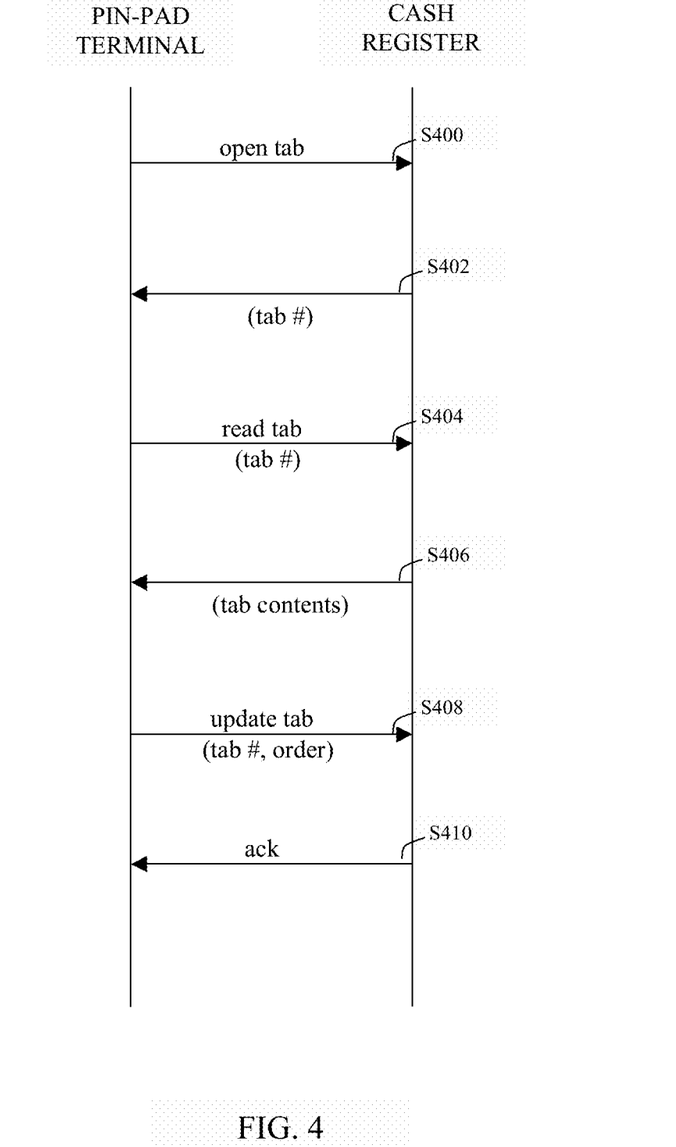
FIG. 4 is a message flow diagram depicting a method of updating the transaction particulars.

Turning initially to FIG. 4, at the outset a services attendant (e.g. waiter, waitress) may attend at one of the tables in the merchant's premises, and takes the food order of the customers at the table. At step S400, the attendant uses a hard-wired or WiFi-enabled pin-pad terminal 300 to transmit an open tab command to the electronic cash register 200, requesting that the electronic cash register 200 open a new tab (pending transaction) in the pending transaction database 250. Where the pin-pad terminal 300 is connected to the electronic cash register 200 via a wired link, the transaction processor of the pin-pad terminal 300 transmits the open tab command directly to the electronic cash register 200 via the wired link. However, where the pin-pad terminal 300 is a WiFi-enabled pin-pad terminal 300, the transaction processor transmits the open tab command indirectly to the electronic cash register 200 via the access point 350.

In response to the open tab command, the pending transaction database 250 opens a new tab and assigns a tab number (unique transaction identifier) to the new tab. The electronic cash register 200 saves the tab number in the memory 214 of the electronic cash register 200, together with an "unlocked" status identifier, and may return the tab number to the pin-pad terminal 300 (via the wired link or the access point 350), at step S402. The transaction processor may display the tab number to the attendant.

The attendant then uses the pin-pad terminal 300 to add the food order to the new tab. To do so, the attendant first inputs the tab number into the pin-pad terminal 300 (if not already entered), and then uses the transaction processor to transmit to the electronic cash register 200 (via the wired link or the access point 350), at step S404, a read tab command that includes the tab number and requests that the electronic cash register 200 provide the pin-pad terminal 300 with the current contents of the tab.

In response to the read tab command, the electronic cash register 200 queries the memory 214 of the electronic cash register 200 with the tab number to determine the status of the tab. If the tab number is associated with a "locked" status identifier (e.g. another attendant is already reading the tab), at step S406 the electronic cash register 200 notifies the pin-pad terminal 300 that the tab is not currently available for reading. This step ensures that multiple pin-pad terminals 200 are not accessing/updating the same open tab at the same time.

If the tab number is associated with an "unlocked" status identifier, the electronic cash register 200 re-associates the tab number in the memory 214 with a "locked" status identifier, queries the pending transaction database 250 with the tab number for the current contents of the tab, and returns the current contents of the tab to the pin-pad terminal 300, at step S406. As will be apparent, immediately after the tab is opened, there will be no food items on the tab.

The attendant then uses the pin-pad terminal 300 to input the food order (particulars of the pending transaction) into the open tab. At step S408, the transaction processor then transmits to the electronic cash register 200 an update tab command that includes the tab number and requests that the electronic cash register 200 add the food order to the tab in the pending transaction database 250.

In response to the update tab command, the electronic cash register 200 updates the tab in the pending transaction database 250 with the food order, and re-associates the tab number in the memory 214 with an "unlocked" status identifier. The electronic cash register 200 may then return an acknowledgement message to the pin-pad terminal 300, at step S410, confirming to the attendant that the tab was successfully updated with the food order.

Steps S406 to S410 may be repeated, with the same or different pin-pad terminals 300, and by the same or different attendants, until the customer requires no further updates to its tab.

Authorizing Electronic Payments for Pending Transactions

Figure 5:
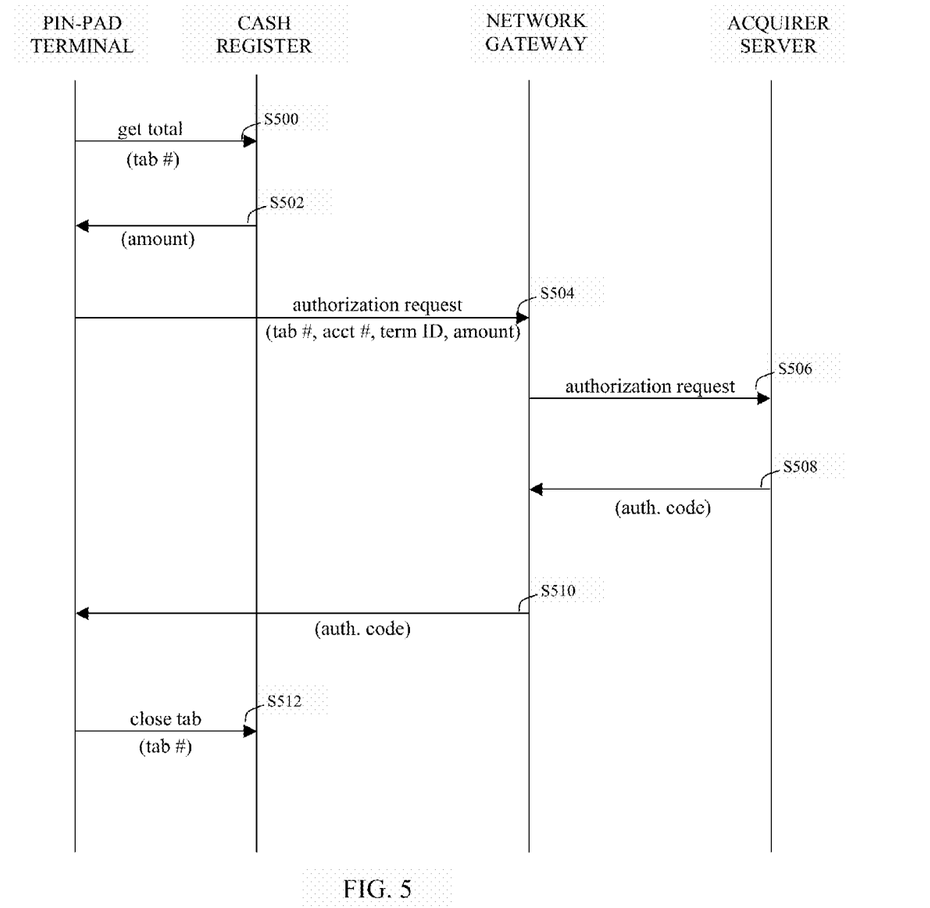
FIG. 5 is a message flow diagram depicting a method of authorizing electronic payments for the transactions.

Turning next to FIG. 5, when the customer wishes to pay for the food orders on its tab, the services attendant uses the transaction processor of the pin-pad terminal 300 to transmit to the electronic cash register 200, at step S500, a get tab total command that includes the tab number and requests that the electronic cash register 200 provide the pin-pad terminal 300 with the outstanding monetary amount owed for the food orders on the tab. At this step, the services attendant may be the premises of the merchant, in which case the pin-pad terminal 300 may be hardwired to the electronic cash register 200 or may be a WiFi-enabled pin-pad terminal 300. Alternately, the customer may have placed its food order with the merchant by telephone or internet, in which case the services attendant may be attending at the premises of the customer (e.g. home delivery) and the pin-pad terminal 300 may be a HSPA-enabled pin-pad terminal 300.

In response to the get tab total command, the electronic cash register 200 queries the memory 214 of the electronic cash register 200 with the tab number for the outstanding monetary amount owed for the food orders on the tab (if the tab number is associated with an "unlocked" status identifier), and returns the outstanding monetary amount to the pin-pad terminal 300, at step S502. The transaction processor directs the outstanding monetary amount to the payment card processor of the pin-pad terminal 300.

The customer then provides electronic payment in the outstanding monetary amount by interfacing the customer's payment card with the payment card interface of the pin-pad terminal 300 to thereby allow the payment card processor to read the account number that is uniquely associated with the payment card. The customer may also use the data input device 202 to provide any required customer credentials (e.g. personal identification number).

At step S504, the payment card processor may transmit to the network gateway 400, via the merchant's secure acquirer network 106, an authorization request message that identifies the tab number, account number, the terminal credential and the monetary amount owed on the tab. Depending upon the functionality implemented by the payment card, the authorization request message may also include a cryptogram generated by the payment card from the outstanding monetary amount and a cryptographic key that is uniquely associated with the payment card.

Where the pin-pad terminal 300 is connected to the electronic cash register 200 via a wired link, the payment card processor transmits the authorization request message to the network gateway 400 via the electronic cash register 200. However, where the pin-pad terminal 300 is a WiFi-enabled or a HSPA-enabled pin-pad terminal 300, the payment card processor transmits the authorization request message to the network gateway 400 via one of the access points 350. In each case, preferably the payment card processor transmits the authorization request message to the network gateway 400 by authenticating to the network gateway 400 using its digital certificate, establishing an encrypted communications channel with the network gateway 400, and transmitting the authorization request message over the encrypted channel.

At step S506, the transaction tracking processor 416 of the network gateway 400 directs the authorization request message to an acquirer server (not shown), which in turn directs the authorization request message to the appropriate issuer server 500, over the payment network 108, for validation. The issuer server 500 authorizes or declines the electronic payment after considering several factors, including whether the financial account associated with the specified account number has sufficient credit/funds to effect payment in the monetary amount owed on the tab and, if the authorization request message included a cryptogram, whether the customer's payment card generated the cryptogram. The issuer server 500 generates a merchant authorization code that indicates whether the electronic payment was authorized or declined, and returns the merchant authorization code to the acquirer server via the payment network 108. The acquirer server directs the merchant authorization code to the network gateway 400, at step S508.

If the merchant authorization code indicates that the electronic payment that was initiated using the pin-pad terminal 300 was authorized, the transaction tracking processor 416 saves in the transactions database 414 particulars (e.g. tab number, account number, monetary amount paid on the tab, terminal credential) of the tab.

At step S510, the network gateway 400 returns the merchant authorization code to the pin-pad terminal 300, via the acquirer network 106. Where the pin-pad terminal 300 is connected to the electronic cash register 200 via a wired link, the payment card processor receives the merchant authorization code from the network gateway 400 via the electronic cash register 200. However, where the pin-pad terminal 300 is a WiFi-enabled or a HSPA-enabled pin-pad terminal 300, the payment card processor receives the merchant authorization code from the network gateway 400 via one of the access points 350.

Depending upon the functionality implemented by the payment card, the payment card processor may request that the payment card confirm that the issuer server 500 authorized the transaction. If the merchant authorization code indicates that the electronic payment was authorized (and optionally the payment card confirmed that the issuer server 500 authorized the transaction), the payment card processor saves in the memory of the pin-pad terminal 300 particulars (e.g. tab number, monetary amount paid, merchant authorization code) of the transaction, and adds the monetary amount paid to the running monetary total amount of all payment transactions authorized using the pin-pad terminal 300 in the current business day.

The transaction processor then transmits to the electronic cash register 200, at step S512, a close tab command that includes the tab number and requests that the electronic cash register 200 mark the specified tab as "closed" in the pending transaction database 250.

Synchronizing Pin-Pad Terminal Records

Figure 6:
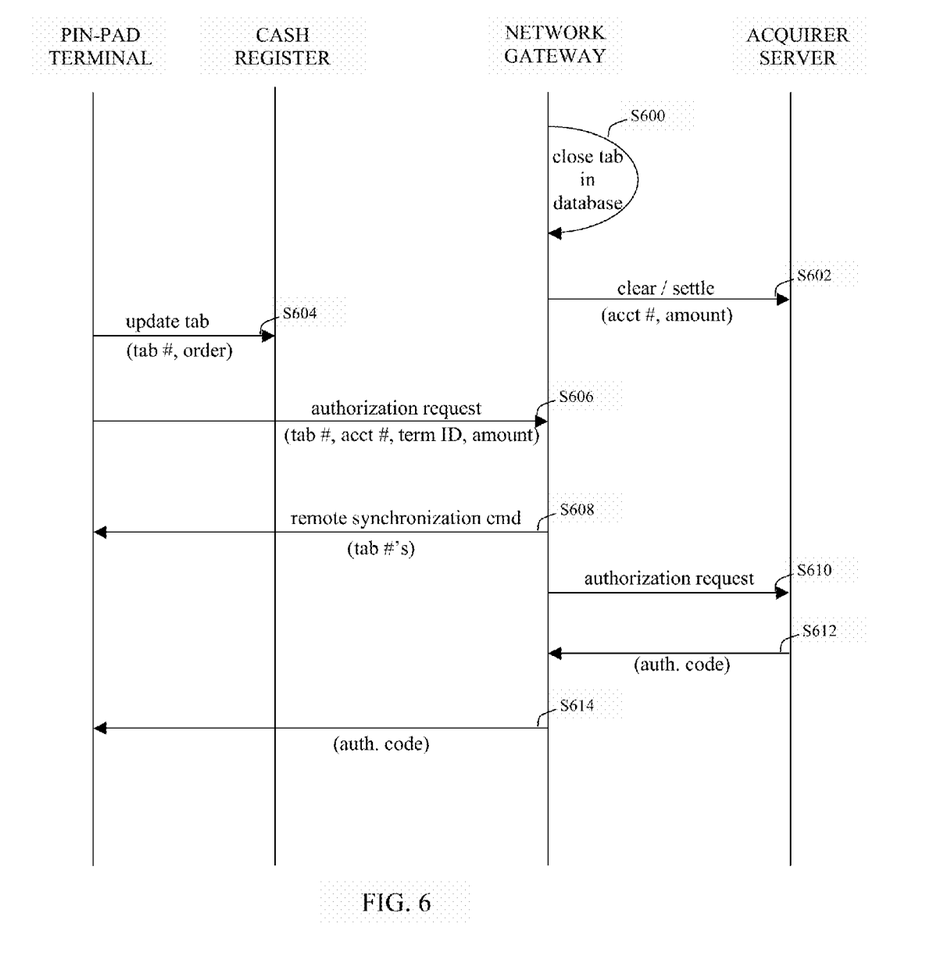
FIG. 6 is a message flow diagram depicting a method of remotely synchronizing pin-pad terminals.

Turning now to FIG. 6, to initiate synchronization of the records of the pin-pad terminals 300, the merchant logs in to the secure web portal of the network gateway 400, and issues to the transaction tracking processor 416 a single close command that requests the transaction tracking processor 416 close out all the saved authorized transactions that are associated with the merchant's pin-pad terminals 300 in the transactions database 414.

In response, the transaction tracking processor 416 queries the merchant database 412 for the terminal credentials of all the pin-pad terminals 300 used by the merchant, locates all tabs in the transactions database 414 the electronic payments for which were authorized and were initiated using any of the merchant's pin-pad terminals 300, and at step S600, associates each located tab in the transactions database 414 with a "closed" status identifier.

At step S602, the transaction tracking processor 416 initiates clearing and settlement of all the located tabs by forwarding to the acquirer server the particulars (e.g. account number, monetary amount paid on the tab) of each located tab. The acquirer server clears the located tabs by calculating the total of the monetary amounts on all the located tabs, and crediting the merchant's financial account in the total calculated amount. The acquirer server then initiates settlement of the located tabs via the payment network 108.

Thereafter, at step S604, the services attendants use the pin-pad terminals 300 to open new tabs and add food orders to the new tabs (as discussed above with reference to steps S400 to S410). When a customer wishes to pay for the food orders on its tab, at step S606 the pin-pad terminal 300 obtains the monetary amount owed for the food orders on the tab, establishes an encrypted communications channel with the network gateway 400, transmits an authorization request message to the network gateway 400 over the encrypted channel (as discussed above with reference to steps S500 to S504). As discussed above, the authorization request message identifies the tab number, account number, the terminal credential of the pin-pad terminal 300, and the monetary amount owed on the tab.

In response, the transaction tracking processor 416 queries the transactions database 414 with the terminal credential to locate all tabs in the transactions database 414 the authorized electronic payments for which were initiated using the merchant's pin-pad terminal 300 and have a "closed" status identifier.

At step S608, the transaction tracking processor 416 responds to the pin-pad terminal 300 with a remote synchronization command that includes the tab number of each of the located "closed" tabs, and commanding the pin-pad terminal 300 to clear the running total amount for the current business day. In response, the pin-pad terminal 300 associates each specified tab in its memory with a "closed" status identifier, and clears the running total in the memory for the current business day.

At step S610, the network gateway 400 directs the authorization request message (received at step S606) to the acquirer server for payment authorization (as discussed above with reference to step S506) and, at step S612, receives a merchant authorization code from the acquirer server (as discussed above with reference to step S508). At step S614, the network gateway 400 returns the merchant authorization code to the pin-pad terminal 300 for further processing (as discussed above with reference to steps S510 to S512).

Since the network gateway 400 issues the remote synchronization command to a pin-pad terminal 300 when the pin-pad terminal 300 communicates with the network gateway 400, the history of closed transactions that were authorized using that particular pin-pad terminal 300 is automatically synchronized with that of the network gateway 400 without manual intervention. Further, since the network gateway 400 issues the remote synchronization command to a pin-pad terminal 300 only in reply to the authorization request message received from that pin-pad terminal 300, synchronization is achieved without undermining the security requirements imposed on the pin-pad terminal 300 by the payment card industry or the security of the terminal-acquirer communications link.

The invention claimed is:

1. A method of remotely synchronizing pin-pad terminals with a central transactions database, each said pin-pad terminal being configured to communicate with a network gateway and having a memory storing particulars of at least one authorized transaction authorized using said pin-pad terminal and a running total value of all transactions authorized using said pin-pad terminal, the network gateway being in communication with at least one of the pin-pad terminals and a merchant acquirer server, the method comprising:

the network gateway receiving from the merchant acquirer server an authorization code for one of the authorized transactions and saving in a central transactions database the particulars of the one authorized transaction;

the network gateway receiving a request to close out all the saved transactions and receiving from one of the pin-pad terminals an authorization request message requesting authorization for an additional transaction and, in response the network gateway:
  (i) in the central transactions database, closing all the saved transactions authorized using the one pin-pad terminal, and
  (ii) responding to the authorization request message by providing the one pin-pad terminal with a remote synchronization command commanding the one pin-pad terminal to clear the running total from the memory.

2. The method according to claim 1, wherein the closing all the saved transactions comprises the network gateway associating with a closed status identifier all the saved transactions authorized using the one pin-pad terminal.

3. The method according to claim 2, wherein the authorization request includes a terminal credential uniquely associated with the one pin-pad terminal, and the responding with a remote synchronization command comprises the network gateway querying the database with the terminal credential to locate the saved transactions associated with the one pin-pad terminal and the closed status identifier.

4. The method according to claim 3, wherein the remote synchronization command further commands the one pin-pad terminal to close the at least one authorized transaction in the memory thereof.

5. The method according to claim 4, further comprising the network gateway initiating authorization for the additional transaction with the merchant acquirer server in response to the authorization request message.

6. A network gateway comprising:
   a network interface configured for communication with at least one pin-pad terminal and a merchant acquirer server, each said pin-pad terminal having a memory storing particulars of at least one authorized transaction authorized using said pin-pad terminal and a running total value of all transactions authorized using the pin-pad terminal;
   a transactions database; and
   a processor coupled to the network interface, and the database and configured to:
      receive from the merchant acquirer server an authorization code for one of the authorized transactions;
      save in the transactions database the particulars of the one authorized transaction;
      receive a request to close out all the saved transactions and to receive from one of the pin-pad terminals an authorization request message requesting authorization for an additional transaction and, in response to:
         (i) in the transactions database, close all the saved transactions authorized using the one pin-pad terminal, and
         (ii) respond to the authorization request message by providing the one pin-pad terminal with a remote synchronization command commanding the one pin-pad terminal to clear the running total from the memory.

7. The network gateway according to claim 6, wherein the processor is configured to close all the saved transactions by associating with a closed status identifier all the saved transactions authorized using the one pin-pad terminal.

8. The network gateway according to claim 7, wherein the authorization request includes a terminal credential uniquely associated with the one pin-pad terminal, and the processor is configured to respond with a remote synchronization command by querying the database with the terminal credential to locate the saved transactions associated with the one pin-pad terminal and the closed status identifier.

9. The network gateway according to claim 8, wherein the remote synchronization command further commands the one pin-pad terminal to close the at least one authorized transaction in the memory thereof.

10. The network gateway according to claim 9, wherein the closing processor is configured to initiate authorization with the merchant acquirer server for the additional transaction in response to the authorization request message.

11. A computer-readable medium carrying computer processing instructions non-transiently stored thereon which, when executed by a computer, cause the computer to perform operations for synchronizing pin-pad terminals with a central transactions database, each pin-pad terminal being configured to communicate with a network gateway and having a memory storing particulars of at least one authorized transaction authorized using said pin-pad terminal and a running total value of all transactions authorized using said pin-pad terminal, the network gateway being in communication with at least one of the pin-pad terminals and a merchant acquirer server, the operations comprising:
   receiving, by the network gateway from the merchant acquirer server, an authorization code for one of the authorized transactions and saving in a central transactions database the particulars of the one authorized transaction;
   receiving, by the network gateway, a request to close out all the saved transactions and receiving from one of the pin-pad terminals an authorization request message requesting authorization for an additional transaction and,
   in response, by the network gateway:
      (i) in the central transactions database, closing all the saved transactions authorized using the one pin-pad terminal, and
      (ii) responding to the authorization request message by providing the one pin-pad terminal with a remote synchronization command commanding the one pin-pad terminal to clear the running total from the memory.

* * * * *